United States Patent
Sticker et al.

(10) Patent No.: US 10,694,265 B2
(45) Date of Patent: Jun. 23, 2020

(54) CABLE CONDUIT FOR DISTRIBUTION PANEL AND DISTRIBUTION PANEL COMPRISING A CABLE CONDUIT

(71) Applicant: MCQ TECH GmbH, Blumberg (DE)

(72) Inventors: Rolf Sticker, Donaueschingen (DE); Felix Lindner, Huefingen (DE)

(73) Assignee: MCQ TECH GmbH, Blumberg (DE)

( * ) Notice: Subject to any disclaimer, the term of this patent is extended or adjusted under 35 U.S.C. 154(b) by 0 days.

(21) Appl. No.: 15/804,724

(22) Filed: Nov. 6, 2017

(65) Prior Publication Data

US 2018/0167700 A1    Jun. 14, 2018

(30) Foreign Application Priority Data

Dec. 9, 2016    (DE) .......................... 10 2016 123 912

(51) Int. Cl.
| | |
|---|---|
| *H04Q 1/14* | (2006.01) |
| *H04Q 1/06* | (2006.01) |
| *H01R 9/24* | (2006.01) |
| *H01R 13/518* | (2006.01) |

(52) U.S. Cl.
CPC ............ *H04Q 1/14* (2013.01); *H01R 9/2416* (2013.01); *H04Q 1/06* (2013.01); *H04Q 1/064* (2013.01); *H04Q 1/066* (2013.01); *H01R 13/518* (2013.01); *H04Q 2201/02* (2013.01)

(58) Field of Classification Search
None
See application file for complete search history.

(56) References Cited

U.S. PATENT DOCUMENTS

| | | | | | |
|---|---|---|---|---|---|
| 5,497,444 | A | * | 3/1996 | Wheeler | G02B 6/4452 385/134 |
| 5,775,956 | A | * | 7/1998 | Sticker | H01R 9/2416 174/72 A |
| 6,077,113 | A | * | 6/2000 | Lecomte | H01R 13/518 439/471 |

(Continued)

FOREIGN PATENT DOCUMENTS

EP    1 455 542 A1    8/2004

OTHER PUBLICATIONS

Velcro_advantages_Do-IT-yourself_Advice_Blog. "https://sailrite.wordpress.com/tag/velcro-advantages/". (Year: 2014).*

(Continued)

*Primary Examiner* — Timothy J Thompson
*Assistant Examiner* — Muhammed Azam
(74) *Attorney, Agent, or Firm* — William Gray Mitchell

(57) ABSTRACT

A cable conduit for distribution panels in network technology is provided comprising a first section for fastening and a second section for guiding cables, in which the first section is embodied such that the cable conduit, seen in the plug-in direction(s) of the distribution panel, can be arranged in front of a distribution panel such that the first section is arranged at a first part of the cable conduit and the second section is arranged at least partially at a second part of the cable conduit, which can be separated from the first part of the cable conduit and after the separation can be reconnected to the first part of the cable conduit, as well as a distribution panel comprising such a cable conduit.

9 Claims, 4 Drawing Sheets

(56) References Cited

U.S. PATENT DOCUMENTS

| | | | | |
|---|---|---|---|---|
| 6,347,715 B1* | 2/2002 | Drozdenko | H01R 9/18 | 211/26 |
| 6,396,992 B1* | 5/2002 | Debal | H04Q 1/13 | 385/135 |
| 6,429,376 B1* | 8/2002 | Mendoza | H02G 3/0406 | 174/101 |
| 6,445,865 B1* | 9/2002 | Janus | G02B 6/4478 | 174/59 |
| 6,556,763 B1* | 4/2003 | Puetz | G02B 6/4452 | 385/134 |
| 6,568,542 B1* | 5/2003 | Chen | H04Q 1/06 | 211/26 |
| 6,671,372 B1* | 12/2003 | Baker | H01R 9/2416 | 379/399.01 |
| 6,818,834 B1* | 11/2004 | Lin | H02G 3/32 | 174/135 |
| 7,000,784 B2* | 2/2006 | Canty | G02B 6/4459 | 211/26 |
| 7,027,706 B2* | 4/2006 | Diaz | G02B 6/4452 | 385/135 |
| 7,091,418 B1* | 8/2006 | Clark | G02B 6/4452 | 174/135 |
| 7,352,947 B2* | 4/2008 | Phung | G02B 6/4459 | 248/49 |
| 7,404,736 B2* | 7/2008 | Herbst | H04Q 1/13 | 439/557 |
| 7,510,421 B2* | 3/2009 | Fransen | H01R 9/2416 | 439/449 |
| 8,093,499 B2* | 1/2012 | Hoffer | H02G 3/0456 | 174/68.1 |
| 9,638,880 B2* | 5/2017 | Smrha | G02B 6/4452 | |
| 9,720,195 B2* | 8/2017 | Giraud | G02B 6/4452 | |
| 9,888,603 B1* | 2/2018 | Vargas | H05K 7/14 | |
| 10,167,981 B2* | 1/2019 | Cheng | F16L 3/137 | |
| 2001/0031124 A1* | 10/2001 | McGrath | H04Q 1/064 | 385/134 |
| 2002/0170726 A1* | 11/2002 | Mendoza | H04Q 1/064 | 174/15.2 |
| 2003/0011988 A1* | 1/2003 | Irmer | H02B 1/50 | 361/690 |
| 2003/0037953 A1* | 2/2003 | Sarkinen | G02B 6/4452 | 174/72 R |
| 2003/0070258 A1* | 4/2003 | Nhep | E05D 7/12 | 16/232 |
| 2005/0221683 A1* | 10/2005 | McGrath | H02G 3/0406 | 439/701 |
| 2005/0247478 A1* | 11/2005 | McGrath | H04Q 1/064 | 174/68.1 |
| 2005/0247650 A1* | 11/2005 | Vogel | H04Q 1/068 | 211/26 |
| 2007/0104450 A1* | 5/2007 | Phung | G02B 6/4459 | 385/137 |
| 2007/0190815 A1* | 8/2007 | Sampson | H04Q 1/06 | 439/49 |
| 2007/0232134 A1* | 10/2007 | Desrochers | H01R 13/6395 | 439/557 |
| 2008/0175552 A1* | 7/2008 | Smrha | G02B 6/4452 | 385/135 |
| 2008/0304803 A1* | 12/2008 | Krampotich | E05B 65/46 | 385/135 |
| 2010/0086273 A1* | 4/2010 | Rector, III | G02B 6/4459 | 385/135 |
| 2011/0274402 A1 | 11/2011 | Giraud et al. | | |
| 2011/0286198 A1 | 11/2011 | Kelly et al. | | |
| 2013/0301225 A1* | 11/2013 | Gong | H05K 7/1491 | 361/729 |
| 2014/0001314 A1* | 1/2014 | Gong | H02G 3/02 | 248/49 |
| 2014/0001315 A1* | 1/2014 | McNeal | F16L 3/00 | 248/67.7 |
| 2014/0097000 A1* | 4/2014 | Lin | H02G 11/00 | 174/135 |
| 2018/0167700 A1* | 6/2018 | Sticker | H04Q 1/06 | |

OTHER PUBLICATIONS

EPO Search Report for related European application 17197700.2, dated Apr. 17, 2018.

Office Action for related German application 102016123912.7, dated Nov. 27, 2019.

* cited by examiner

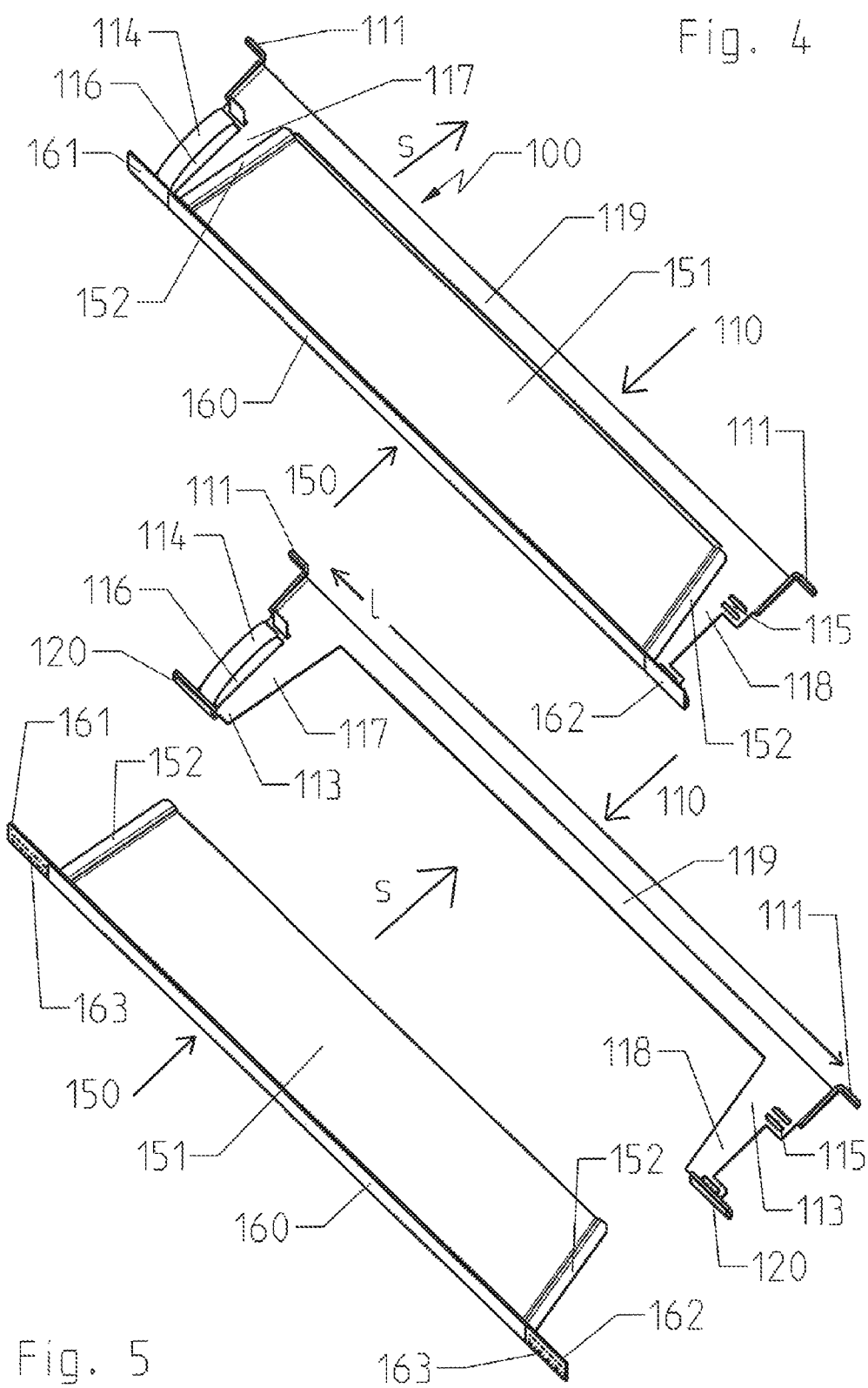

CABLE CONDUIT FOR DISTRIBUTION PANEL AND DISTRIBUTION PANEL COMPRISING A CABLE CONDUIT

CROSS REFERENCE TO RELATED APPLICATIONS

This patent application claims priority to German Patent Application 10 2016 123 912.7, filed on Dec. 9, 2016.

STATEMENT REGARDING FEDERALLY SPONSORED RESEARCH OR DEVELOPMENT

No federal government funds were used in reasearching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a cable conduit for distribution panel and distribution panel comprising a cable conduit.

Background of the Invention

The invention relates to a cable conduit for a distribution panel comprising the features of the preamble of claim 1 and a distribution panel, particularly a distribution panel for a switchboard for network technology, comprising such a cable conduit.

The connection of an electronic component with a plurality of cables, such as fiber optic cables or copper patch cables, occurs usually via a distribution panel, which may be arranged e.g., in a rack or a switchboard for network technology. Here, it has proven advantageous to use cable conduits, which guide the inserted cables, usually laterally towards the outside. This compensates on the one hand the weight of the cables and thus leads to strain relief, while on the other hand the orderly arrangement of the cables is improved and "cable spaghetti" is avoided. For installation in a rack or switchboard for network technology the cable conduits are usually arranged underneath and/or above the distribution panel and thus require additional storage height in the cabinets. For example, in the widely used 19" technology usually one height unit per cable conduit system is required.

Such a cable conduit known from prior art is described in the following based on FIG. 1.

The objective of the invention is to provide improved cable conduits, which particularly reduce the space requirements without reducing user comfort, and also provide a distribution panel equipped with such an improved cable conduit. This objective is solved with a cable conduit having the characteristics described herein.

BRIEF SUMMARY OF THE INVENTION

In a preferred embodiment, a cable conduit (100) for distribution panels (20) in network technology with a first section for fastening and with a second section for guiding cables (40), characterized in that the first section is embodied such that the cable conduit (100), seen in the plug-in direction(s) of the distribution panel (20), can be arranged in front of a distribution panel (20) and that the cable conduit (100) is embodied in at least two parts such that the first section is arranged at a first part (110) of the cable conduit (100) and the second section is at least partially arranged at a second part (150) of the cable conduit (100), which can be separated from the first part (110) of the cable conduit (100) and, after such separation, can be reconnected to the first part (110) of the cable conduit (100).

In another preferred embodiment, a cable conduit (100) as described herein, characterized in that the second part (150) comprises at least one part of a support area (151) for cables (40).

In another preferred embodiment, a cable conduit (100) as described herein, characterized in that the second part (150) comprises a labeling area (160).

In another preferred embodiment, a cable conduit (100) as described herein, characterized in that the labeling area (160) is continuous such that it extends over at least 50% of the extension of the distribution panel (20) in its longitudinal direction.

In another preferred embodiment, a cable conduit (100) as described herein, characterized in that the part of the support area (151) for cables (40) allocated to the second part (150) is essentially aligned perpendicular to the labeling area (160) such that it forms a cross-section through the second part (150) which shows a L-shaped basic form.

In another preferred embodiment, a cable conduit (100) as described herein, characterized in that the first part (110) comprises an internal contour or a part of an internal contour to accept a section of the second part (151) showing an external contour shaped in a complementary fashion to the internal contour.

In another preferred embodiment, a cable conduit (100) as described herein, characterized in that the internal contour tapers in the plug-in direction(s).

In another preferred embodiment, a cable conduit (100) as described herein, characterized in that the edge section of the internal contour and/or the edge section of the external contour, formed in a complementary fashion to the internal contour, comprise at least sectionally guide elements and/or form a guide.

In another preferred embodiment, a cable conduit (100) as described herein, characterized in that fixing means (120) are provided for fixing the first part (110) at the second part (150).

In another preferred embodiment, a cable conduit (100) as described herein, characterized in that the first part (110) includes a section with a support area (113) for cables (40).

In another preferred embodiment, a cable conduit (100) as described herein, characterized in that the first part (110) comprises a device (116) for fixing cables (40) at a support area (113) of the first part (110).

In another preferred embodiment, a cable conduit (100) as described herein, characterized in that the device (116) for fixing cables, provided at the support area of the first part, comprises at least one Velcro tape (114) which is guided through at least one slot (115) provided in the first part.

In another preferred embodiment, a distribution panel (20) with a surface (70) at the plug-in side and a plurality of connections (80) arranged at the plug-in side surface (70), particularly in the form of plugs and/or receptacles for generating a connection to a respective plurality of cables (40) with appropriate receptacles and/or plugs, and with a cable conduit (100) for ordering and/or compensating the weight of such cables (40) when they are connected to the distribution panel (20), characterized in that the cable conduit (100) is a cable conduit (100) as described herein.

In another preferred embodiment, a distribution panel (20) as descrived herein, characterized in that the cable conduit (100) is arranged at the plug-in side surface (70) of the distribution panel (20) and, seen from the plug-in direction (2), covers at least a portion of the plug-in side surface (70) of the distribution panel (20).

BRIEF DESCRIPTION OF THE DRAWINGS

FIG. 4 is a line drawing evidencing the embodiment of a cable conduit used in FIG. 2 in the assembled state.

FIG. 5 is a line drawing evidencing the embodiment according to FIG. 4 in the disassembled state.

DETAILED DESCRIPTION OF THE INVENTION

Figure 1:
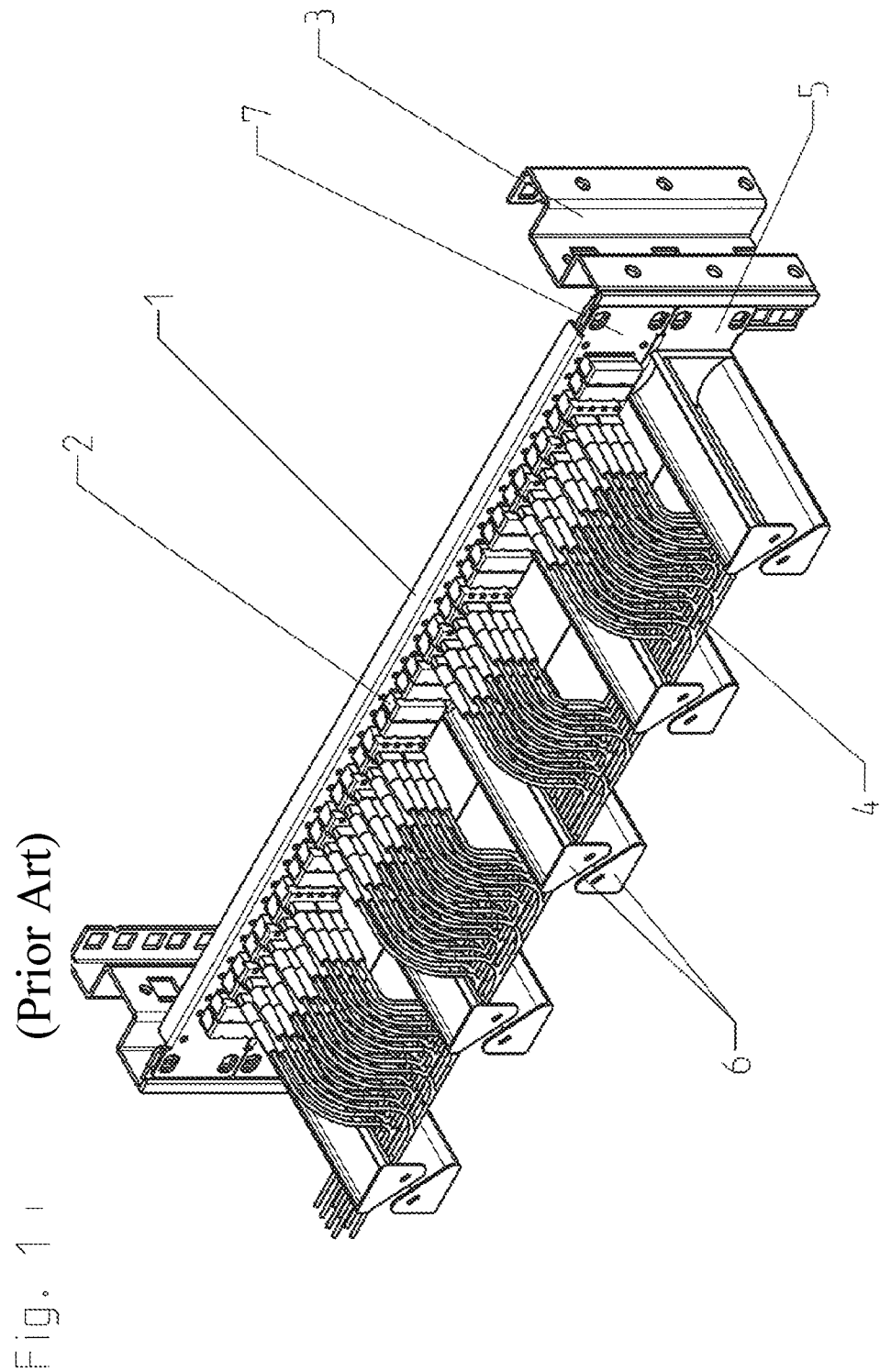
FIG. 1 is a line drawing evidencing a distribution panel arranged in a rack comprising a cable conduit according to prior art with cables connected thereto.

The cable conduit according to the invention for distribution panels in network technology comprises at least a first section for fastening and a second section for guiding cables, particularly when they are connected with and/or to the distribution panel. According to the invention it is essential that the first section is embodied such that the cable conduit, seen in the plug-in direction of the distribution panel, can be arranged in front of the distribution panel and that the cable conduit is embodied in at least two parts so that the first section is arranged at a first part of the cable conduit and the second section is arranged at least partially at a second part of the cable conduit, which is embodied in a manner detachable from the first part, and after the separation can be reconnected to the first part (which is particularly not the case for two parts provided at the distribution panel distanced from each other and forming the cable conduit). Being attachable represents in the sense of this disclosure that a contact can be generated between the two parts, which remains upheld without external forces being applied.

By combining these measures it is possible to arrange the cable conduit in the plug-in direction in front of the distribution panel, thus in the direction in which the cables are connected to the distribution panel, without this significantly limiting the option to remove or add individual cables, because by the separation of the second part from the first part an opportunity is generated to access the distribution panel.

Here it is particularly preferred when the second part shows at least a portion of a contact area for cables, because this way improved strain release can be provided for the cables.

When it is additionally provided that the second part shows a labeling area, the distribution panel can be operated in a particularly clearly laid-out fashion. This applies particularly when the labeling area is continuous so that it extends over at least 50%, particularly at least 70%, particularly preferred at least 90% of the extension of the distribution panel in its longitudinal direction. This way a sufficiently large area can be provided in order to render a labeling surface available for the necessary information regarding the configuration of the distribution panel, which increases operating safety and avoids faulty allocation of connections.

Here it is particularly advantageous when the part of the support area for cables, allocated to the second part, is arranged essentially perpendicular to the labeling surface so that it shows a cross-section through the second part, which shows a L-shaped basic form. In particular, when implementing this feature the part of the second component forming the support area for cables when in the installed status, meaning when connected to a first component fastened to the distribution panel, may extend horizontally and thus perform the best possible support for the cables, while the labeling area extends vertically and this way is presented directly to the eye of the user.

It is further preferred when the first part shows an internal contour for accepting a section of the second part with an external contour matching the internal contour. This way it can be particularly ensured that the second part assumes a defined target position in the state connected to the first part.

Such an internal contour can also be realized, though, when the cable conduit shows more than two parts, two of which for example serving for fastening at the distribution panel and the internal contour being formed from edge sections of several parts serving for fastening at the distribution panel.

When it is ensured that the internal contour tapers in the plug-in direction it can be achieved that the second part is automatically guided into the desired target position during the connection process.

Here it is particularly preferred when the edge section of the internal contour and/or the edge section of the external contour, formed in a complementary fashion matching the internal contour, form at least sectionally guide elements and/or a guide.

In order to ensure that the connection between the first part and the second part can be released only in a targeted fashion it may be beneficial to provide fixing means for fixing the first part to the second part. These fixing means may be embodied for example from Velcro, magnets, mechanic locks, or threaded connections.

It may be particularly advantageous when the first part also comprises a support area for cables. This ensures that when accessing the distribution panel in order to add or remove cables, during the removal of the second part from the first part, the cables do not simply drop in an uncontrolled fashion or dangle, and this makes the subsequent renewed connection of the second part to the first part significantly easier.

In a variant of this embodiment the first part comprises a device for fixing cables to a contact area of the first part, which securely prevents that cables slide out of place from the contact area of the first part during the removal of the second part from the first part. It has proven particularly beneficial for this purpose to design such a device for fixing cables when it comprises at least one Velcro tape, which is guided through at least one slot provided in the first part.

As common for distribution panels, the distribution panel according to the invention comprises a surface at the plug-in side and a plurality of plugs and/or receptacles arranged at the surface of the plug-in side for generating a connection to a matching plurality of cables with appropriate receptacles and/or plugs and a cable conduit to arrange and/or compensate the weight of such cables, when they are connected to the distribution panel. Here, according to the invention, the cable conduit is a cable conduit according to the invention as described above.

In an advantageous embodiment of such a distribution panel it is provided that the cable conduit is arranged at the plug-in side surface of the distribution panel and, seen from the plug-in direction, at least partially covers a part of the surface of the distribution panel at the plug-in side. This way, compared to solutions of prior art, a significant space saving effect can be yielded and increased installation density of the rack of the network switchboards is possible.

DETAILED DESCRIPTION OF THE FIGURES

FIG. 1 represents prior art. It shows an arrangement of a distribution panel 1 with a cable conduit 5 in a section of an only partially shown rack 3, which may be e.g., a component of a network switchboard.

The distribution panel 1 comprises a surface 7 at the plug-in side and a plurality of connections 2 arranged at the surface 7 at the plug-in side, which here are shown embodied as receptacles, to generate the connection to a matching plurality of cables 4 showing appropriate complementary connections, which are here shown embodied as plugs.

As easily imagined, in such a plurality of cables problems quickly develop when they are allowed to just dangle freely and unorganized. This is particularly true when several distribution panels 1 are arranged in the rack 3. Therefore, a cable conduit 5 is arranged in the rack 3 underneath the distribution panel 1, in which the cables 4 are guided between cable guide elements 6, respectively arranged in pairs, laterally towards the outside, ensuring on the one hand strain release of the connections and on the other side an orderly and neat cable guidance. Simultaneously, due to the arrangement of the cable conduits 5 underneath the distribution panel 1, the connection means 2 of the distribution panel 1 remain accessible in rack 3 so that another cable 4 can be inserted, a cable 4 can be removed, or a cable 4 can be replaced by another cable 4, if necessary.

Figure 2:
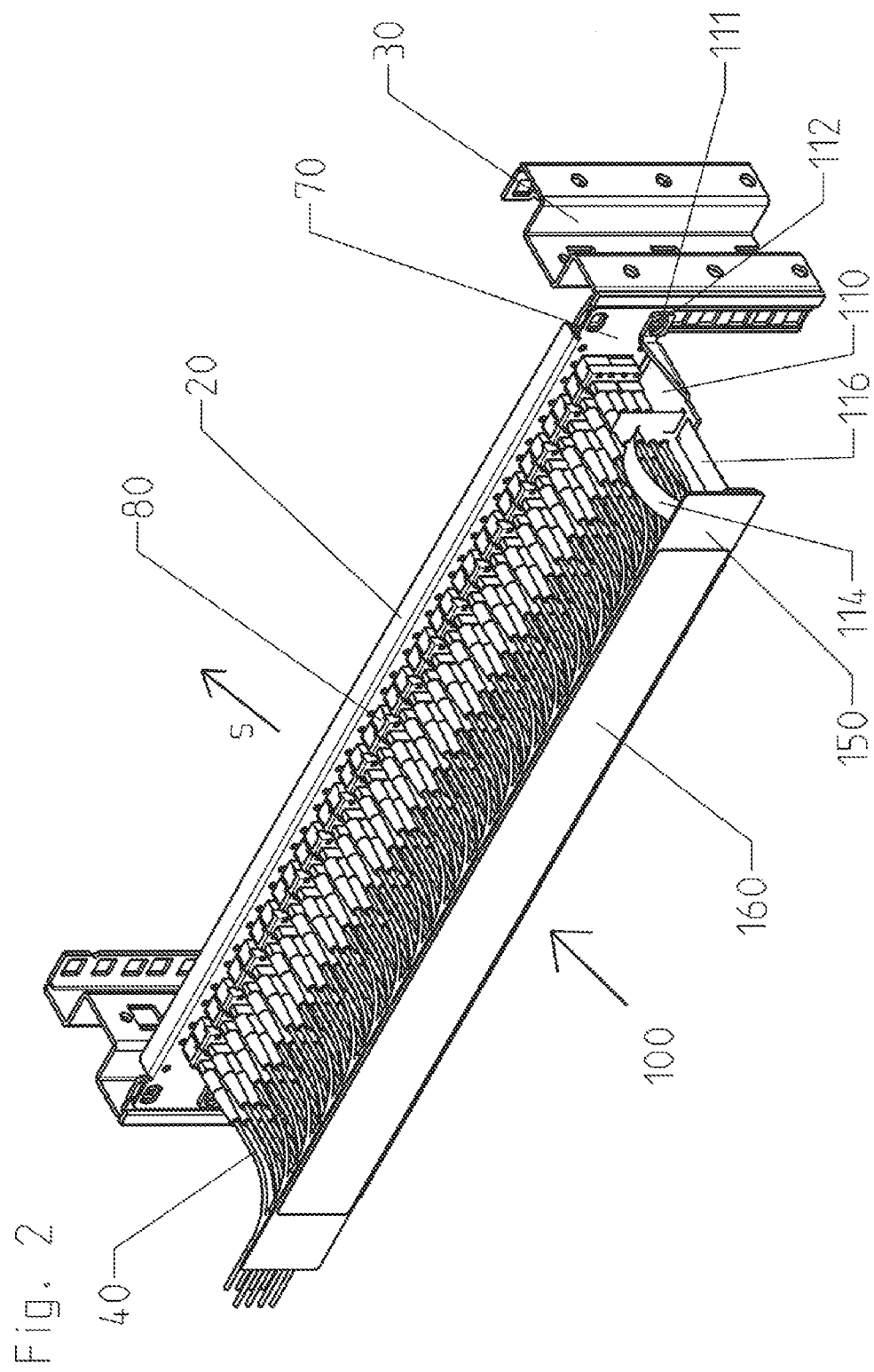
FIG. 2 is a line drawing evidencing an embodiment of a distribution panel according to the invention with a two-part cable conduit.
Figure 3:
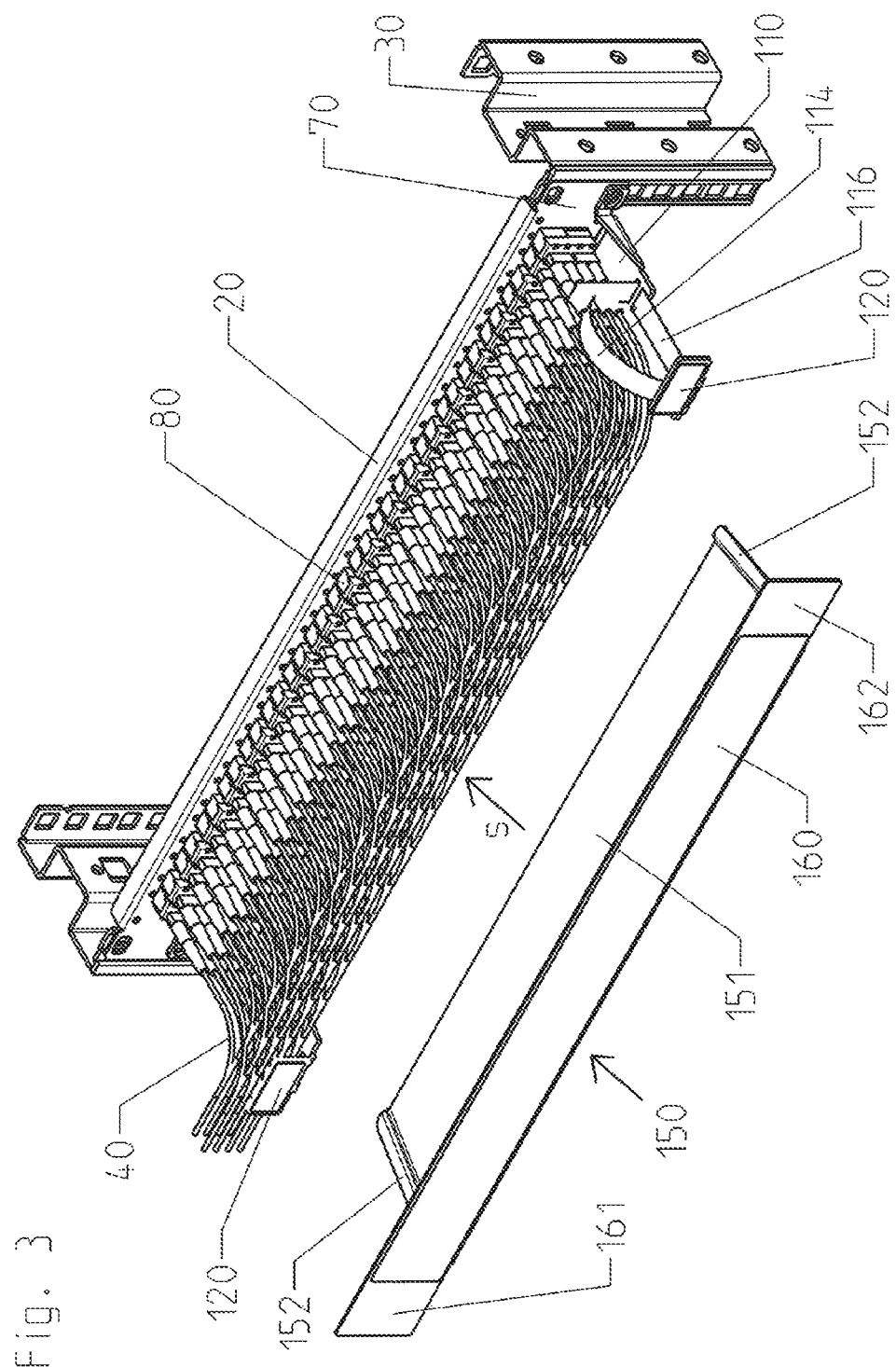
FIG. 3 is a line drawing evidencing an embodiment according to FIG. 2 in which a portion of the two-part cable conduit is removed.

When comparing distribution panels 1 known from prior art with cable conduits 5 according to FIG. 1 with the embodiment shown in FIGS. 2 and 3 of a distribution panel 20 arranged at a rack 30, shown partially, with a cable conduit 100, with a surface 70 at the plug-in side, and a plurality of connections 80 arranged at the surface 70 at the plug-in side, which are here embodied for example as receptacles to generate the connection to a matching plurality of cables 40 with accordingly complementary connections, which are here shown for example embodied as plugs, immediately the space-saving effect and the extremely orderly progression of the cables 40 are discernible, which is yielded by the invention.

Unlike prior art, the cable conduit 100, which comprises a first part 110 and a second part 150, is arranged directly at the distribution panel 20 with screws 112, penetrating fastening flanges 111 arranged laterally at the cable conduit 100, fasten the cable conduit 100 and the distribution panel 20 jointly at the rack 30.

The extremely orderly overall impression is here even emphasized in that the second part 150 shows a labeling area 160, arranged perpendicular to the support area 151 of the second part, which extends essentially over the entire length of the distribution panel 20, and may contain on the one hand information regarding the configuration of the individual connections of the distribution panel 20 and on the other hand largely hides the cables 40 from the direct view of the user.

Simultaneously, due to the two-part embodiment of the cable conduit 100 it is also possible, by removing the second part 150 of the cable conduit 100 from the first part 110 of the cable conduit, to generate the situation shown in FIG. 3, in which the cables 40 can be removed without greater hindrance or additional cables 40 can be plugged into free receptacles.

Here it must be particularly observed that, as explained in greater detail in the following, support areas 113 for cables 40 are also provided at the first part 110, which in turn show a device 116 for fixing cables 40, here embodied as Velcro tapes 114 guided through slots 115 in the support area 113 of the first part 110 such that even in case of a removed second part 150 any disorderly dangling cable spaghetti is avoided.

The design of a preferred exemplary embodiment of the cable conduit 100 according to the invention is particularly clearly shown in FIG. 4, which shows the cable conduit 100 in the assembled state, and 5, which displays the cable conduit 100 in the disassembled state. The cable conduit 100 comprises a first part 110 and a second part 150.

The first part 110 is adjusted with regards to its length l to the length of the distribution panel, the cables of which shall be guided through the cable conduit 100, and comprises in its lateral end section respectively a fastening flange 111 by which the first part can be fastened at the distribution panel. Particularly preferred is here a fastening by a screw 112, which is twisted through the fastening flange 111 and a bore in the distribution panel into a thread in the rack such that the cable conduit 100 is connected to the distribution panel and the cable conduit 100 and the distribution panel are fastened to the rack as shown e.g., in FIG. 2.

The external contour of the first part 110 of the cable conduit 100 is essentially embodied in the form of a U with a straight bottom. The internal contour of the U forms here a seat for the second part 150 of the cable conduit 100. In the exemplary embodiment the insides of the legs 117, 118 of the U approach each other in the direction towards the basis 119 of the U such that the interior contour narrows in the plug-in direction s, represented by an arrow in FIGS. 2 to 5.

The legs 117, 118 of the U, more precisely said parts thereof, form a support area for supporting the second part 150 of the cable conduit 100 on which a support section 152 of the second part 150 rests in the assembled state such that the forces applied by the cables 40 upon the support area 151 of the second part 150 are compensated and guided off via the first part 110.

Further, at the first part 110 support areas 113 are provided for the cables 40, which in turn show respectively a device 116 for fixing cables 40, realized here as Velcro tapes 114 guided through slots 115 in the support area 113 of the first part 110.

Fixing means 120 are respectively provided at the facial areas of the lateral legs 117, 118 of the U for fixing the second part 150 at the first part 110.

The second part 150 of the cable conduit 100 is formed in this example by a support area 151, on which the labeling area 160 rests perpendicularly. Accordingly, the second part 150 shows a plurality of intersecting areas, which are stretched by a vector in accordance with the plug-in direction and a normal vector to the support area 151, each showing an L-shaped cross-section.

The labeling area 160 extends here with the sections 161, 162 beyond the support area 151, allowing a cooperation of the fixing means 120 with the corresponding fixing means 163 arranged at these sections in the direction towards the distribution panel 20.

The support area 151 shows, as clearly discernible in FIGS. 4 and 5, an external contour which is complementary to the internal contour. Further support sections 152 of the second part 150 are provided at the support area 151, as already mentioned, which rest on the first part 110 when the second part 150 is connected to the first part 110 such that the forces applied by the cables 40 upon the support area 151 of the second part 150 of the cable conduit 100 are compensated and guided off via the first part 110 of the cable conduit 100.

Simultaneously the support sections 152, the internal contour of the first part 110, and the external contour of the support area 151 cooperate as guides for the second part 150 at the first part 110.

LIST OF REFERENCE NUMBERS

1 Distribution panel
2 Connection
3 Rack
4 Cable
5 Cable conduit
6 Cable conduit element
7 Plug-in side surface
20 Distribution panel
30 Rack
40 Cable
70 Plug-in side surface
80 Connection
100 Cable conduit
110 First part
111 Fastening flange
112 Screw
113 Support area
114 Velcro tape
115 Slot
116 Device
117,118 Leg
119 Basis
120,163 Fixing means
150 Second part
151 Support area
152 Support sections
160 Labeling area
161,162 Section
s Plug-in direction
l Length The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A two part cable conduit for distribution panels in network technology, such cable conduit to be arranged in front of a distribution panel, wherein a first part for fastening cables is removably connected to a second part for guiding the cables, the first part comprises one or more components forming an internal contour and the second part comprises one or more components forming an external contour, which internal and external contours match and thus allow the first part and second part to interlock, further comprising wherein fixing means are provided for fixing the first part and the second part and wherein the internal contour tapers in the plug-in direction.

2. The cable conduit according to claim 1, wherein the second part comprises at least one part of a support area for cables.

3. The cable conduit according to claim 2, wherein the second part comprises a labeling area.

4. The cable conduit according to claim 3, wherein the labeling area is continuous such that it extends over at least 50% of the extension of the distribution panel in its longitudinal direction.

5. The cable conduit according to claim 3, wherein the part of the support area for cables allocated to the second part is aligned perpendicular to the labeling area such that it forms a cross-section through the second part, which second part shows a L-shaped basic form.

6. The cable conduit according to claim 1, wherein the first part includes a section with a support area for cables.

7. The cable conduit according to claim 6, wherein the first part comprises a device for fixing cables at a support area of the first part.

8. The cable conduit according to claim 1, wherein an edge section of the internal contour and another edge section of the external contour, formed in a complementary fashion to the internal contour, comprise at least sectionally guide elements and/or form a guide.

9. A cable conduit according to claim 7, wherein the device for fixing cables, provided at the support area of the first part, comprises at least one Velcro tape which is guided through at least one slot provided in the first part.

* * * * *